W. C. MORRIS.
WAGON BRAKE.
APPLICATION FILED FEB. 12, 1915.
1,233,102.
Patented July 10, 1917.
2 SHEETS—SHEET 1.
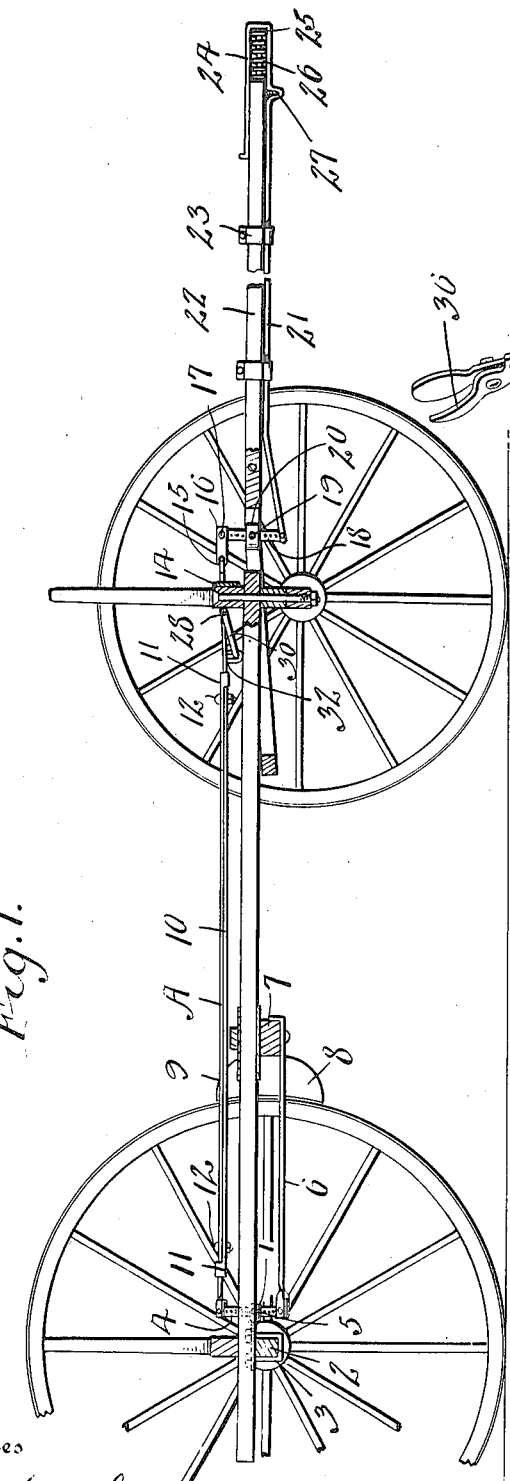
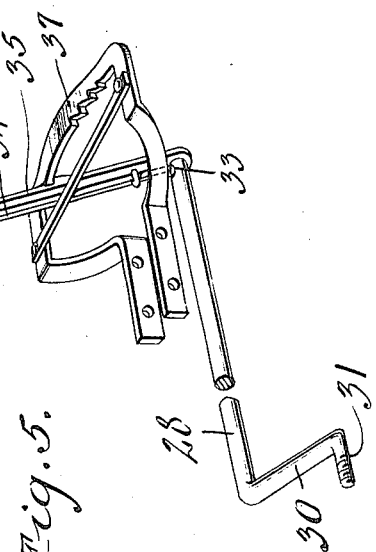
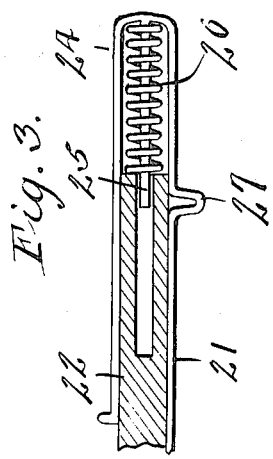
Inventor
W. C. Morris,
By Victor J. Evans
Attorney
Witnesses

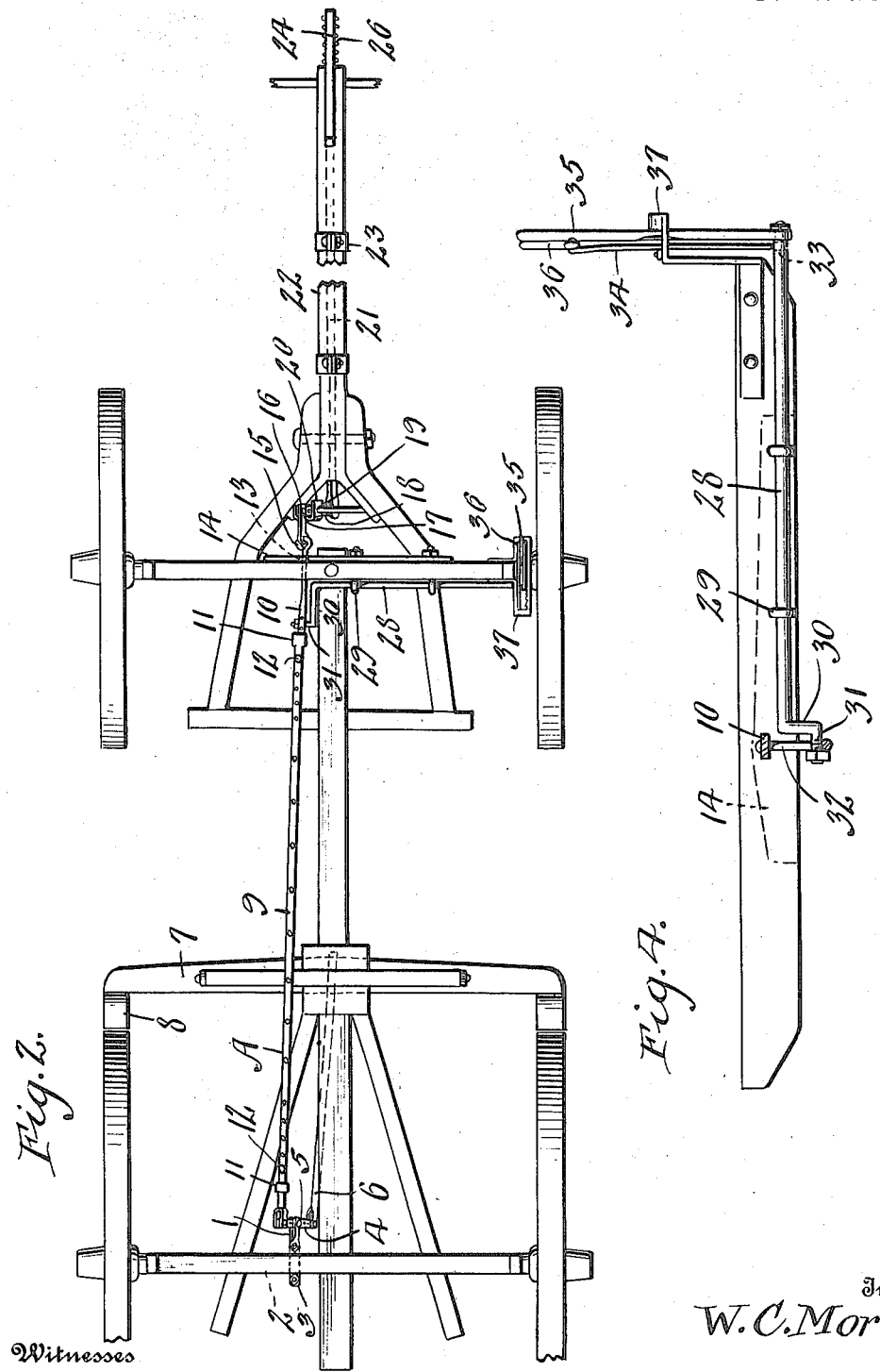

UNITED STATES PATENT OFFICE.

WILLIAM CLYDE MORRIS, OF HYATTSVILLE, WYOMING.

WAGON-BRAKE.

1,233,102.  Specification of Letters Patent.  Patented July 10, 1917.

Application filed February 12, 1915. Serial No. 7,782.

*To all whom it may concern:*

Be it known that I, WILLIAM CLYDE MORRIS, a citizen of the United States, residing at Hyattsville, in the county of Bighorn and State of Wyoming, have invented new and useful Improvements in Wagon-Brakes, of which the following is a specification.

This invention relates to wagon brakes, the object in view being to produce a brake of the class referred to which is adapted for operation either by the hold back action of the draft animals or by hand, or by both of said means, the brake mechanism being instantly adjustable by the driver for operation in either way stated.

A further object of the invention is to provide in connection with the brake mechanism and the hold back operating means, a hand lever, and connections between said hand lever and an element of the hold back mechanism, whereby said hand lever, while normally disconnected from the hold back mechanism, may be connected to or engaged therewith when occasion requires.

With the above and other objects in view, the invention consists in the novel construction, combination and arrangement of parts, as herein described, illustrated and claimed.

In the accompanying drawings:—

Figure 1 is a vertical longitudinal section through a wagon illustrating the brake mechanism of this invention applied thereto.

Fig. 2 is a plan view of the same.

Fig. 3 is a detail section taken longitudinally of the forward end of the wagon tongue, showing the goose-neck, guide and spring.

Fig. 4 is a detail view of the rock shaft and a portion of the pull rod showing the slotted arm.

Fig. 5 is a detail view of the hand lever and latch.

Referring to the drawings 1 designates a fulcrum iron which is secured to the rear axle 2 by means of a clip 3, the fulcrum iron 1 being thus held stationary. The fulcrum iron 1 is slotted or forked as shown to receive a brake lever 4 which is connected therewith by means of a pivot 5. Connected to one extremity of the lever 4 is a link or brake beam arm 6, to the extremity of which is attached the brake beam 7 provided with the usual brake shoes 8 adapted to move into and out of contact with the rear wheels.

Connected to the upper extremity of the brake lever 4 is a longitudinally extensible pull rod designated generally at A and comprising the two members 9 and 10 bearing an overlapping relation to each other and each provided with a terminal eye or loop 11 to maintain the two sections of the pull rod in proper relation to and contact with each other, one or more bolts or fasteners 12 being employed for fastening the sections 9 and 10 of the rod together after the necessary adjustment thereof has been obtained.

The forward end portion of the rod A passes through an eye or guide opening 13 in a reinforcing plate 14 which is fastened to the forward bolster and in advance of the plate 14 and forward bolster. The pull rod A has connected thereto by a joint 15, a link 16 which is pivotally connected at 17 to a reverse motion lever 18 which is fulcrumed at 19 on a hanger 20 secured to a convenient part of the running gear such as the queen rod.

Connected to the opposite extremity of the lever 18 is a push rod 21 which extends along the wagon tongue 22 and is guided relatively thereto and supported by means of metal loops or guides 23. The forward extremity of the push rod 21 is recurved in parallel relation to itself to form a goose-neck 24 which extends around the forward extremity of the wagon tongue and in the center of the bend of the goose-neck 24 there is attached a guide pin 25 which is slidingly received in a central longitudinal bore in the forward extremity of the wagon tongue. A brake relief spring 26 encircles the guide pin 25 and bears against the extremity of the wagon tongue so as to thrust the goose-neck 24 and push rod 21 in a forward direction so as to offset the brake shoes from the rear wheels. The goose-neck 24 is provided with an eye 27 to receive the harness yoke so that when the animals pull back in descending a grade, they will thrust the push rod 21 rearwardly, thereby drawing the pull rod 9 in a forward direction and setting the brakes.

The means for setting the brakes by hand comprises a rock shaft 28 which is journaled in a plurality of eye bolts 29 extending rearwardly from the bolster and the reinforcing plate 14. One end of the rock shaft 28 is bent substantially at a right angle to provide a crank arm 30 at the end of which is a pin or journal 31 which works back and forth in a slotted arm 32 of the pull rod A. At its opposite end the rock shaft 28 is formed with a hole 33 extending transversely therethrough and adapted to receive the extremity of a latch rod 34 which is carried by a hand lever 35 and operated by a thumb lever 36 fulcrumed on the hand lever 35 and by means of which the latch rod 34 may be moved into engagement with the rock shaft 28 or moved out of engagement therewith. A holding rack 36 is fastened to the wagon and used in conjunction with the hand lever 35 to maintain any adjustment of said lever.

The latch 34 is normally out of engagement with the shaft 28 and is thrown into engagement therewith for locking the lever 35 thereto by grasping the latch lever 36 and moving the same toward the handle of the lever 35. The hand lever may be then used as an adjunct to the hold back mechanism for assisting in the application of the brake shoes to the wheels.

From the foregoing description taken in connection with the accompanying drawings it will now be seen that when the brake mechanism is to be set by hand, the latch rod 34 is moved into engagement with the rock shaft 28 and then when the hand lever 35 is manipulated, the coöperation of the crank arm 30 and slotted arm 32 will produce a back and forth movement of the rod A and a corresponding action of the brake shoes. When it is desired to have the brakes applied by the holding back action of the draft animals alone, the hand lever 35 is disconnected from the rock shaft 28 by withdrawing the latch rod 34.

The mechanism hereinabove described may be used on almost any standard two-horse wagon and will operate automatically under the action of the draft animals but, as noted, may be manually operated whenever desired.

What I claim is:—

1. A wagon brake adapted for operation either by the hold back operation of the draft animals or by hand, the same comprising a slidable member mounted on the wagon tongue, a spring resisting the sliding action of said member, brake mechanism operatively connected with said slidable member and embodying a pull rod having a slotted arm, a rock shaft extending transversely of the running gear and having at one end thereof a crank slidable in the slotted arm of said pull rod, a hand lever normally loose on said rock shaft, and a manually operable latch carried by said hand lever and adapted to coöperate with the rock shaft to lock said hand lever to said shaft.

2. A wagon brake adapted for operation either by the hold back operation of the draft animals or by hand, the same comprising a brake beam, a goose neck slidably mounted on the forward extremity of the wagon tongue, operating connections between said goose neck and brake beam, the forward extremity of the tongue being formed with a longitudinal bore constituting a guide-way, a guide pin extending from the forward end of the goose neck into said guide-way in which it is slidable, and an expansion spring coiled around said guide-pin and interposed between the extremity of the tongue and the forward end of said goose neck.

In testimony whereof I affix my signature in presence of two witnesses.

WILLIAM CLYDE MORRIS.

Witnesses:
   ALBERT WELCH,
   GEO. H. CROSBY.